United States Patent
Jiang et al.

(10) Patent No.: US 10,438,043 B2
(45) Date of Patent: Oct. 8, 2019

(54) METHOD AND SYSTEM FOR IDENTIFYING FINGERPRINT

(71) Applicant: FUJIAN LANDI COMMERCIAL EQUIPMENT CO., LTD., Fuzhou, Fujian (CN)

(72) Inventors: Jinyang Jiang, Fujian (CN); Fangyao Ye, Fujian (CN)

(73) Assignee: FUJIAN LANDI COMMERCIAL EQUIPMENT CO., LTD., Fuzhou (CN)

( * ) Notice: Subject to any disclaimer, the term of this patent is extended or adjusted under 35 U.S.C. 154(b) by 102 days.

(21) Appl. No.: 15/871,150

(22) Filed: Jan. 15, 2018

(65) Prior Publication Data
US 2018/0137328 A1 May 17, 2018

Related U.S. Application Data

(63) Continuation of application No. PCT/CN2016/091973, filed on Jul. 28, 2016.

(30) Foreign Application Priority Data

Aug. 14, 2015 (CN) .......................... 2015 1 0498076

(51) Int. Cl.
*G06K 9/00* (2006.01)

(52) U.S. Cl.
CPC ............ *G06K 9/0004* (2013.01); *G06K 9/00* (2013.01); *G06K 9/00033* (2013.01); *G06K 9/00046* (2013.01); *G06K 9/00087* (2013.01)

(58) Field of Classification Search
CPC ..... G06K 9/0004; G06K 9/00; G06K 9/00033; G06K 9/00046; G06K 9/00087
See application file for complete search history.

(56) References Cited

U.S. PATENT DOCUMENTS

| | | | |
|---|---|---|---|
| 6,373,969 B1* | 4/2002 | Adler | G06K 9/00046 382/116 |
| 2013/0181213 A1* | 7/2013 | Han | H01L 29/24 257/43 |
| 2014/0068113 A1* | 3/2014 | Yang | G06F 13/4068 710/16 |
| 2015/0020181 A1* | 1/2015 | Iwata | G06F 21/32 726/7 |
| 2016/0232401 A1* | 8/2016 | Hoyos | G06T 7/11 |
| 2017/0228575 A1* | 8/2017 | Shin | G06K 9/00046 |

FOREIGN PATENT DOCUMENTS

CN 103400435 A 11/2013

* cited by examiner

*Primary Examiner* — David F Dunphy

(57) ABSTRACT

The invention discloses a method and system for identifying fingerprint. The method comprises: S1: adjusting a camera to focus the camera on a lens; S2: capturing continuously by the camera fingerprint images formed by a finger pressing the lens, and sending the fingerprint images to an image processing module; and S3: processing the fingerprint images by the image processing module so as to acquire fingerprints. In this way, only a common camera is required for acquiring the fingerprint according to the invention, which is easy to operate at a low cost.

8 Claims, 2 Drawing Sheets

METHOD AND SYSTEM FOR IDENTIFYING FINGERPRINT

CROSS REFERENCE TO RELATED APPLICATIONS

The present application is a Continuation Application of PCT Application No. PCT/CN2016/091973 filed on Jul. 28, 2016, which claims the benefit of Chinese Patent Application No. 201510498076.6 filed on Aug. 14, 2015. All the above are hereby incorporated by reference.

FIELD OF THE INVENTION

The invention relates to the field of biometric identification technology, and in particular, to a method and system for identifying a fingerprint.

BACKGROUND OF THE INVENTION

With the continuous advancement of science and technology and the ever-increasing demands on secure identification, the application of fingerprint identification has become more and more widespread. A fingerprint module is directly used on most existing electronic devices that support fingerprinting, such as an optical fingerprint module and a semiconductor fingerprint module or the like. The optical fingerprint module has a complicated structure, while the semiconductor fingerprint module typically has a higher price, and has more limitations on the design of product.

The prior art patent (Chinese patent application No. 201310352969.0) discloses a fingerprint identification access control management system, which includes a fingerprint input module, a fingerprint verification module, an electronic lock module, and a liquid crystal display module. The fingerprint input module includes a fingerprint camera and a storage unit. A fingerprint image captured by the fingerprint camera is stored in the storage unit. The fingerprint verification module includes a fingerprint comparison unit and a fingerprint identification unit. The electronic control lock module includes a user name and a password input. The liquid crystal display module includes a liquid crystal display. The fingerprint input module, the fingerprint verification module, and the liquid crystal display module are connected with the electronic lock module. Image acquisition and image processing are not mentioned in this reference document. However, image acquisition and image processing are important steps for obtaining a fingerprint image with high accuracy.

SUMMARY OF THE INVENTION

Technical Problem

The technical problem to be solved by the invention is to use a common camera to acquire fingerprint images, and compare the acquired fingerprint images to obtain fingerprints, which is easy to operate at a low cost.

Technical Solution

In order to solve the above-mentioned technical problem, the invention adopts the following technical solution. A method for identifying a fingerprint is provided, which includes:

S1: adjusting a camera to focus the camera on a lens;
S2: capturing continuously by the camera fingerprint images formed by a finger pressing the lens, and sending the fingerprint images to an image processing module; and
S3: processing the fingerprint images by the image processing module so as to acquire the fingerprint.

In order to solve the above-mentioned technical problem, a system for identifying fingerprint is further provided by the invention, which includes: a camera, a lens and an image processing module, and the system performs the following steps:

S1: adjusting the camera to focus the camera on the lens;
S2: capturing continuously by the camera fingerprint images formed by a finger pressing the lens, and sending the fingerprint images to the image processing module; and
S3: processing the fingerprint images by the image processing module so as to acquire the fingerprint.

Advantageous Effects

The invention has the following advantageous effects: in contrast to the prior art, in the invention, the camera is focused on the lens, fingerprint images of a finger pressing on the lens are acquired, and the fingerprint images are sent to the image processing module for processing so as to acquire the fingerprint. In this way, only a common camera is required for acquiring the fingerprint according to the invention, which is easy to operate at a low cost.

BRIEF DESCRIPTION OF THE ACCOMPANYING DRAWINGS

DETAILED DESCRIPTION OF THE PREFERRED EMBODIMENTS

The main concept of the invention is to capture fingerprint images using a common camera and process the acquired fingerprint images to obtain a fingerprint.

Figure 1:
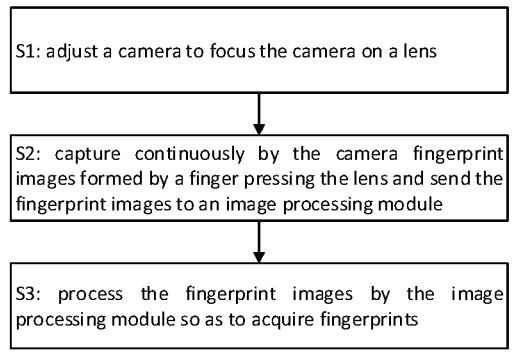
FIG. 1 is a schematic flowchart of a method according to a first embodiment of the invention.

Referring to FIG. 1, a method for identifying a fingerprint is provided according to a first embodiment of the invention, which includes:

S1: adjusting a camera to focus the camera on a lens;
S2: capturing continuously by the camera fingerprint images formed by a finger pressing the lens, and sending the fingerprint images to an image processing module; and
S3: processing the fingerprint images by the image processing module so as to acquire the fingerprint.

In contrast to the prior art, in the first embodiment of the invention, the camera is focused on the lens, fingerprint images of a finger pressing on the lens are acquired, and the fingerprint images are sent to the image processing module for processing so as to acquire the fingerprint. In this way, only a common camera is required for acquiring the fingerprint according to the invention, which is easy to operate at a low cost.

Figure 2:
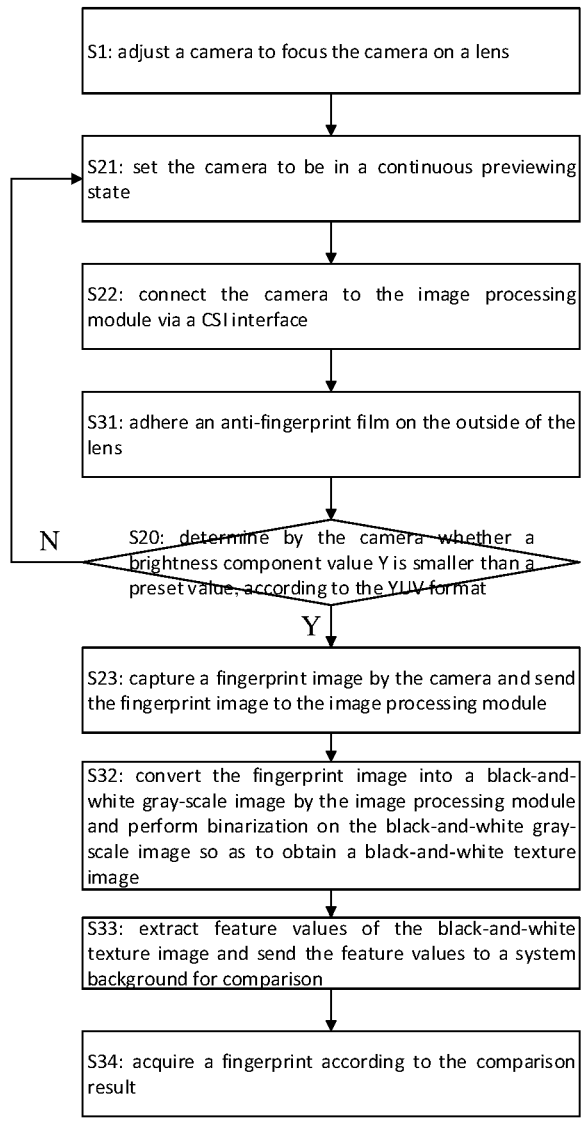
FIG. 2 is a schematic flowchart of a method according to a second embodiment of the invention.
Figure 3:
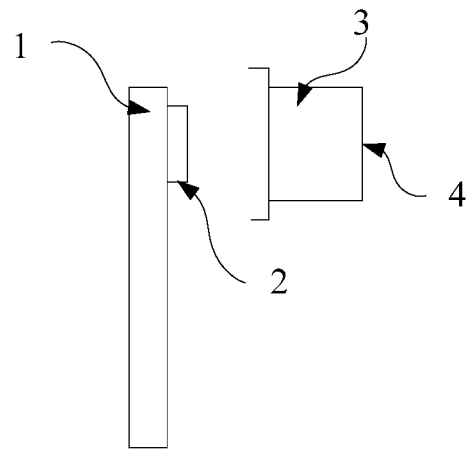
FIG. 3 is a schematic diagram of various components in a specific embodiment of the invention.
Figure 4:
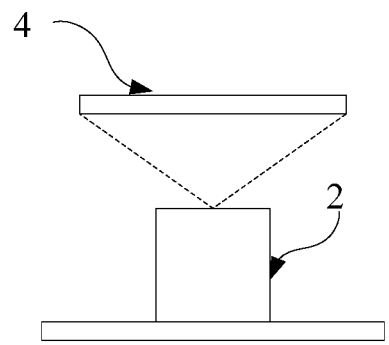
FIG. 4 is a schematic diagram of an operational component for acquiring a fingerprint in a specific embodiment of the invention.

Referring to FIG. 2 to FIG. 4, on the basis of the first embodiment, before step S3, the second embodiment further includes:

S31: adhering an anti-fingerprint film on the outside of the lens.

Since the camera specially used for fingerprint collection is typically expensive, existing common cameras can be used in all the embodiments of the invention, such as a common high-definition camera (the number of pixels are equal to or greater than 5 million). In the embodiment of the invention, a fingerprint identification auxiliary structure 3 may be added to the auto-focus camera 2 of a common PDA or a cell-phone 1. The auxiliary structure is a hollow lens cone, the camera 2 can be covered by one side of the lens cone, and the lens 4 can be provided on the other side of the lens cone. An anti-fingerprint film is adhered on the outside of the lens 4. The film can directly contact the finger. When the finger presses on the lens 4, no fingerprint is left. After the finger is pressed on the lens 4, an image containing the finger texture can be formed on the other side of the lens 4, and the fingerprint can penetrate the lens 4 and be captured by the camera 2. According to the invention, the focus of the camera 2 is aligned with the center of the lens 4, and the auto-focus camera can be used for achieving auto-focusing.

Before step S2, the method further includes:

S21: setting the camera to be in a continuous previewing state; and

S22: connecting the camera to the image processing module via a CSI interface.

The purpose of setting the camera to be in a continuous previewing state is to acquire fingerprint images in real-time and make a timely adjustment as required, including adjusting the position of finger pressing or the focal length so as to obtain the fingerprint image with the best resolution. The images are continuously sent to the image processing module. The image processing module can be a device that can perform image processing, such as a CPU.

The step S2 specifically includes:

S20: determining by the camera whether a brightness component value Y is smaller than a preset value, according to the YUV format;

executing S23 of capturing fingerprint images by the camera and sending the fingerprint images to the image processing module, if the brightness component value Y is smaller than the preset value;

otherwise, capturing continuously by the camera fingerprint images formed by a finger pressing the lens, and returning to the execution of S21.

Specifically, the previewed image is sent by the camera to the CPU for processing, via the CSI interface, and the determination according to the YUV format is made. When the finger is not pressed, the image captured by the camera has a high brightness; and after the finger is pressed, the image is dark. Therefore, it is determined whether the finger is pressed by determining a change of image brightness signal Y value. In a practical operation, the preset brightness value can be set. If the brightness signal Y value is smaller than the preset brightness value, it indicates that the finger is pressed, and then the camera captures the fingerprint image; and if the brightness signal Y value is larger than the preset brightness value, it indicates that no finger pressing is sensed, and the user needs to press the finger again; the image is further acquired, the determination steps are repeated, and the captured image is sent to the CPU for image processing.

The step S3 of processing the fingerprint image specifically includes:

S32: converting the fingerprint image into a black-and-white gray-scale image by the image processing module and performing binarization on the black-and-white gray-scale image so as to obtain a black-and-white texture image;

S33: extracting feature values of the black-and-white texture image and sending the feature values to a system backstage for comparison;

S34: acquiring a fingerprint according to the comparison result.

Specifically, the processing procedure is: the color picture of the fingerprint image captured by the camera is converted into a black-and-white gray-scale image, and then the binarization processing is performed on the image so as to obtain the black-and-white texture image of the fingerprint; feature values of the black-and-white texture image are extracted, the identified feature values are sent to the system backstage for comparison. Whether the fingerprint identification is successful is fed back according to the comparison result. If the fingerprint identification is successful, the fingerprint is obtained; otherwise, the next operation is waited for.

In contrast to the prior art, according to the second embodiment of the invention, an anti-fingerprint film is adhered on the outside of the lens so as to obtain a clear fingerprint of the finger, and it is determined whether finger pressing is sensed according to the change of the brightness so as to automatically realize capturing of image. Image conversion and feature value extraction are performed on the images in the image processing module for eventually obtaining the fingerprint. In this way, only a common camera is required for acquiring the fingerprint according to the invention, which is easy to operate at a low cost.

Figure 5:
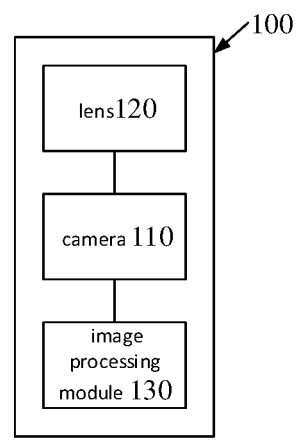
FIG. 5 is a structural block diagram of a system according to a third embodiment of the invention.

As shown in FIG. 5, a system 100 for identifying fingerprint is provided according to a third embodiment of the invention, which includes: a camera 110, a lens 120 and an image processing module 130, and the system performs the following steps:

S1: adjusting the camera 110 to focus the camera 110 on the lens 120;

S2: capturing continuously by the camera 110 fingerprint images formed by a finger pressing the lens, and sending the fingerprint images to the image processing module 130; and S3: processing the fingerprint images by the image processing module 130 so as to acquire the fingerprint.

Before step S3, the following step is further included:

S31: adhering an anti-fingerprint film on the outside of the lens 120.

Before step S2, the following step is further included:

S21: setting the camera 110 to be in a continuous previewing state; and

S22: connecting the camera 110 to the image processing module 130 via a CSI interface.

The step S2 specifically includes:

S20: determining by the camera 110 whether a brightness component value Y is smaller than a preset value according to the YUV format;

executing S23 of capturing fingerprint images by the camera 110 and sending the fingerprint images to the image processing module 130, if the brightness component value Y is smaller than the preset value;

otherwise, returning to the execution of S21.

The step S3 specifically includes:

S32: converting the fingerprint image into a black-and-white gray-scale image by the image processing module 130 and performing binarization on the black-and-white gray-scale image so as to obtain a black-and-white texture image;

S33: extracting feature values of the black-and-white texture image and sending the feature values to a system backstage for comparison;

S34: acquiring a fingerprint according to the comparison result.

What is claimed is:

1. A method for identifying fingerprint, comprising:

S1: adjusting a camera to focus the camera on a lens;

S2: capturing continuously by the camera preview fingerprint images formed by a finger pressing the lens, and sending a fingerprint image to an image processing module; and S3: processing the fingerprint image by the image processing module so as to authenticate the fingerprint;

wherein, step S2 specifically comprises:

S20: determining by the camera whether a brightness component value Y is smaller than a preset value, according to the YUV format;

executing S23 of capturing the fingerprint image by the camera and sending the fingerprint image to the image processing module, if the brightness component value Y is smaller than the preset value;

otherwise, executing S24 of capturing continuously by the camera the preview fingerprint images formed by the finger pressing the lens, and returning to the execution of S20.

2. The method for identifying a fingerprint according to claim 1, wherein, before step S3, the method further comprises:

S31: adhering an anti-fingerprint film on the outside of the lens.

3. The method for identifying a fingerprint according to claim 1, wherein, before step S2, the method further comprises:

S21: setting the camera to be in a continuous previewing state; and

S22: connecting the camera to the image processing module via a CSI interface.

4. The method for identifying a fingerprint according to claim 1, wherein, step S3 specifically comprises:

S32: converting the fingerprint image into a black-and-white gray-scale image by the image processing module and performing binarization on the black-and-white gray-scale image so as to obtain a black-and-white texture image;

S33: extracting feature values of the black-and-white texture image and sending the feature values to a system backstage for comparison;

S34: authenticating the fingerprint according to the comparison result.

5. A system for identifying fingerprint, comprising a camera, a lens and an image processing module, the system performing the following steps:

S1: adjusting the camera to focus the camera on the lens;

S2: capturing continuously by the camera preview fingerprint images formed by a finger pressing the lens, and sending a fingerprint image to the image processing module; and S3: processing the fingerprint image by the image processing module so as to authenticate the fingerprint;

wherein, step S2 specifically comprises:

S20: determining by the camera whether a brightness component value Y is smaller than a preset value, according to the YUV format;

executing S23 of capturing the fingerprint image by the camera and sending the fingerprint image to the image processing module, if the brightness component value Y is smaller than the preset value;

otherwise, executing S24 of capturing continuously by the camera the preview fingerprint images formed by the finger pressing the lens, and returning to the execution of S20.

6. The system for identifying fingerprint according to claim 5, wherein, before step S3, the following step is further included:

S31: adhering an anti-fingerprint film on the outside of the lens.

7. The system for identifying fingerprint according to claim 5, wherein, before step S2, the following step is further included:

S21: setting the camera to be in a continuous previewing state; and

S22: connecting the camera to the image processing module via a CSI interface.

8. The system for identifying fingerprint according to claim 5, wherein, step S3 specifically comprises:

S32: converting the fingerprint image into a black-and-white gray-scale image by the image processing module and performing binarization on the black-and-white gray-scale image so as to obtain a black-and-white texture image;

S33: extracting feature values of the black-and-white texture image and sending the feature values to a system backstage for comparison;

S34: authenticating the fingerprint according to the comparison result.

* * * * *